Feb. 13, 1968 R. W. STRACHAN 3,369,108
TEMPERATURE CONTROLLER
Filed May 11, 1965 3 Sheets-Sheet 1

FIG.I.

Richard W. Strachan
Inventor
Koenig, Senniger, Powers and Leavitt
Attorneys

Feb. 13, 1968 R. W. STRACHAN 3,369,108
TEMPERATURE CONTROLLER
Filed May 11, 1965 3 Sheets-Sheet 2

United States Patent Office 3,369,108
Patented Feb. 13, 1968

3,369,108
TEMPERATURE CONTROLLER
Richard W. Strachan, Providence, R.I., assignor to Texas Instruments Incorporated, Dallas, Tex., a corporation of Delaware
Filed May 11, 1965, Ser. No. 454,776
10 Claims. (Cl. 219—501)

ABSTRACT OF THE DISCLOSURE

A temperature controller is disclosed in which the energization of an electric heater is varied by varying the phase angle of triggering of an SCR which applies power to the heater. The SCR is triggered by a saturable reactor having a magnetic core which is periodically magnetized in one direction by a first winding to an extent which varies as a function of the resistance of a thermistor sensing the temperature in the zone affected by the heater. The core is alternatively magnetized in the opposite direction by a second winding to an extent which is a function of time. The second winding is interconnected with the gate of the SCR to trigger the SCR into conduction after the core saturates and thus the time at which the SCR is triggered varies as a function of the previous magnetization of the core by the first winding.

---

This invention relates to a temperature controller and more particularly to a temperature controller which exercises proportional control.

Among the several objects of the invention may be noted the provision of a temperature controller which maintains the controlled temperature at a preselected level with a very high degree of accuracy; the provision of such a controller which exhibits high gain over a band of proportional control; the provision of such a controller which has a rapid response; the provision of such a control which exercises a stable control over a wide range of environmental conditions; the provision of such a controller which itself dissipates relatively little power; the provision of such a controller which is compact; and the provision of such a controller which is relatively simple and inexpensive in construction and reliable in operation. Other objects and features will be in part apparent and in part pointed out hereinafter.

Briefly, a temperature controller of the invention includes means such as a heater which, when energized, varies the temperature in the zone whose temperature is to be controlled. The temperature varying means is energized through a triggerable semiconductor switching device which controls the nominal energization of the temperature varying means. A thermistor senses the temperature in the zone. The thermistor is interconnected with a first winding on a saturable magnetic core in a circuit which periodically magnetizes the core in one direction to an extent which is a function of the temperature of the thermistor. A second circuit which includes a second winding on the core operates alternately with the first circuit to energize the core in the opposite direction to an extent which is a function of time. The second winding is interconnected with the triggerable semiconductor switching device for triggering the device into conduction after the core saturates, the time at which the device is triggered being a function of the previous magnetization of the core by the first winding. Accordingly, the proportion of time during which the semiconductor device conducts power to the temperature varying means is a function of the temperature of the zone thereby maintaining the zone temperature at a predetermined value.

The invention accordingly comprises the apparatus and methods hereinafter described, the scope of the invention being indicated in the following claims.

In the accompanying drawings, in which several of various possible embodiments of the invention are illustrated:

Corresponding reference characters indicate corresponding parts throughout the several views of the drawings.

Figure 1:
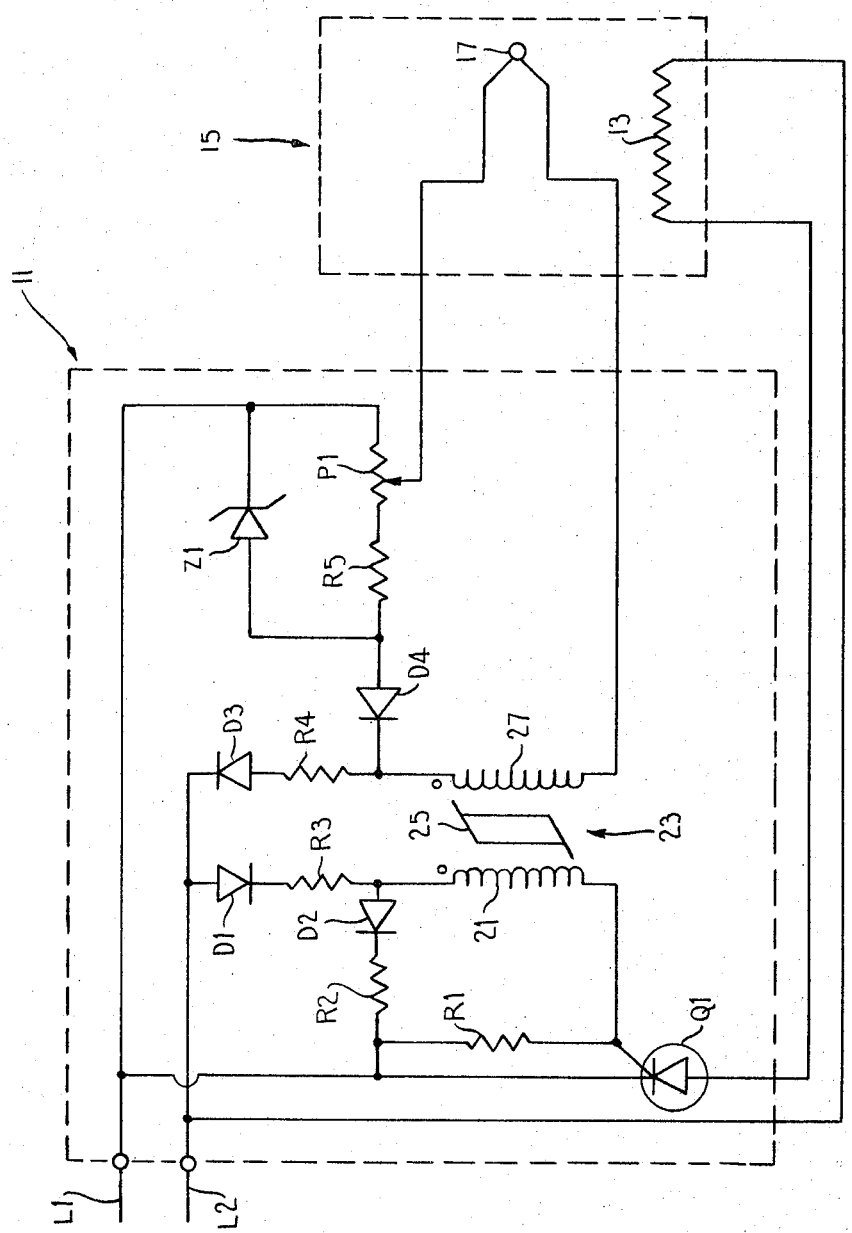
FIG. 1 is a schematic circuit diagram of a temperature controller which controls the energization of a heater to maintain the temperature in a controlled zone at a predetermined level.

Referring now to the temperature controller shown in FIG. 1, A.C. power, for example at 115 volts and 60 c.p.s., is provided to the control circuitry indicated generally at 11 through lines L1 and L2. Control circuitry 11 is operative to modulate the power supplied to an electric heater 13 for maintaining the temperature within a controlled zone 15 at a preselected level. As explained hereinafter, the control circuitry 11 is responsive to changes in the resistance of a thermistor 17 which is adapted to sense the temperature within zone 15.

Heater 13 is provided with half wave rectified electric power through the anode-cathode circuit of a silicon controlled rectifier (SCR) Q1. The SCR Q1 is a semiconductor current switching device which can be triggered into conduction by current applied to its gate electrode when its anode-cathode circuit is forward biased. Once conduction is initiated, the device remains in conduction until the forward bias is removed by means external to the rectifier.

Figure 2:
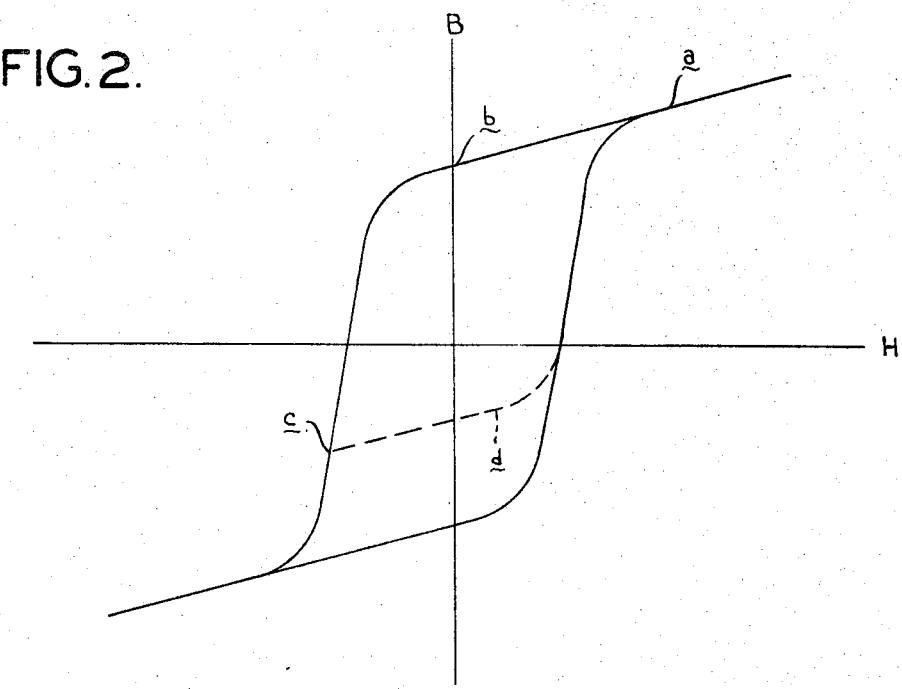
FIG. 2 is a graph representing the magnetic behavior of a saturable reactor core employed in the controller of FIG. 1.

Incremental modulation of the power supplied to heater 13 is provided by varying the firing time or phase angle of the SCR triggering relative to the half cycles of A.C. power during which SCR Q1 is forward biased. By varying the firing time, the proportion of time during which power is supplied to heater 13 is also varied. Triggering current for the gate circuit of SCR Q1 is provided from line L2 on every other A.C. half cycle through a series circuit including a diode D1, resistor R3 and the gate winding 21 of a saturable triggering reactor 23. Saturable reactor 23 includes a magnetic core which possesses so-called square loop hysteresis characteristics. The core having these characteristics is represented in the drawings by the symbol indicated at 25 and the magnetic hysteresis behavior of the core is represented in FIG. 2 by the solid line curves. The junction between the resistor R3 and gate winding 21 is connected to the other power line L1 through a diode D2 and a resistor R2, resistors R2 and R3 thus constituting a voltage divider which reduces the voltage applied to the gate winding 21. The gate-cathode circuit of SCR Q1 is shunted by a resistor R1 so that relatively small currents flowing through gate winding 21 will not trigger the rectifier into conduction.

A series circuit including diode D3, resistor R4, diode D4, resistor R5 and potentiometer P1 is connected between lines L2 and L1. The various resistances in this series circuit constitute a voltage divider through which current flows on those A.C. half cycles during which diodes D3 and D4 are forward biased. The peak voltage across resistor R5 and potentiometer P1 is regulated by a Zener diode Z1.

Saturable reactor 23 also includes a reset winding 27 wound on core 25. Reset winding 27 is connected in series with thermistor 17. One end of the reset winding 27 is connected to the junction between resistor R4 and diode D4 and one end of thermistor 17 is connected to the variable tap of potentiometer P1. Thus, an adjustable portion of the Zener regulated voltage appearing across resistor R5 and potentiometer P1 is applied to the series connected winding 27 and thermistor 17. Each diode D2 and D4 decouples the respective winding 21 and 27 when the opposite winding is being energized from the line L2 so that current interaction between the gate winding 21 and the reset winding 27 is prevented.

The operation of the controller shown in FIG. 1 is as follows, reference being had also to FIG. 2 to illustrate the hysteresis characteristics of the saturable core 25. During those A.C. half cycles which forward bias diodes D1 and D2, SCR Q1 is triggered by current flowing through R3 only after core 25 saturates in the corresponding magnetic direction. Until saturation occurs, the flow of current to the SCR gate electrode is opposed by the inductive reactance voltage developed in winding 21 by the increasing magnetic flux in core 25. However, after the core saturates, winding 21 exhibits a low impedance and triggering current can flow to the gate of SCR Q1. Assuming that SCR Q1 has just been triggered, core 25 will be in a state indicated at $a$ in FIG. 2. At the end of the triggering half cycle, the magnetizing current applied to winding 21 is withdrawn so that the core returns to the state indicated at $b$.

On the half cycles when diodes D3 and D4 are forward biased, a regulated voltage is applied across thermistor 17 and reset winding 27. This voltage produces a current flow in winding 27 which tends to magnetize core 25 in the opposite magnetic direction. As long as the core 25 does not saturate in this reverse direction, an inductive reactance voltage will appear across winding 27 so that the regulated voltage applied will be divided between winding 27 and the thermistor 17. The rate at which the flux increases in the core 25 is therefore a function of the resistance of thermistor 17. The final value attained by the flux at the end of any cycle, and thus the magnetization of the core 25, is dependent upon the rate at which the flux in the core 25 increases, the time being fixed at ½ cycle. The relative values of the resistance of thermistor 17 at the desired temperature in zone 15 and the reactance of winding 27 during increasing magnetization of core 25 are chosen so that the greater portion of the total available voltage appears across the thermistor. Thus, relatively small changes in the resistance of the thermistor will produce comparatively large changes in the rate at which the flux builds up in the core 25. The absolute values are chosen in relation to the applied voltage so that, in the temperature range which is to be controlled, the core 25 will not become saturated in this direction but rather will attain only some intermediate magnetization indicated at $c$ in FIG. 2. The particular amount of magnetization will thus be a function of the resistance of thermistor 17 at that moment. Thus, when the applied A.C. then returns to a triggering half cycle during which diodes D1 and D2 are forward biased, the magnetization of core 25 will behave substantially as represented by the broken line curve designated at $d$ on FIG. 2.

As noted previously, the SCR Q1 will not fire until the core 25 is saturated by a current flowing in winding 21, that is, until the core approaches the state indicated at $a$ in FIG. 2. The time required to reach saturation for the given voltage applied to winding 21 depends upon the previous magnetization of core 25 by the winding 27. Thus, this delay is also a function of the resistance of thermistor 17 since that resistance is greater than the reactance of winding 27 and is thus the factor which largely determines the reset magnetization. Accordingly, variations in the resistance of thermistor 17 will vary the firing angle of SCR Q1 and thereby modulate the average power supplied to heater 13.

Thermistor 17 has a negative temperature coefficient so that, as the temperature increases, its resistance decreases. A decrease in thermistor resistance causes an increase in the reset magnetizing current and thus it also increases the delay which must elapse before firing of SCR Q1 on the triggering A.C. half cycle. An increased delay leaves less time for current to flow through heater 13 during the remainder of the A.C. half cycle and thus the average power to heater 13 is decreased as a result of increasing thermistor temperature. Accordingly, a stable and proportional negative feedback is obtained which maintains the temperature in zone 15 at a predetermined level. Since small changes in the resistance of thermistor 17 produce substantial changes in the core magnetization as noted previously, the feedback loop possesses high gain and a tight or precise control of temperature is obtained. The particular level which is maintained can be preselected by adjustment of potentiometer P1 to obtain that nominal power flow which gives thermal equilibrium at the desired temperature.

Figure 3:
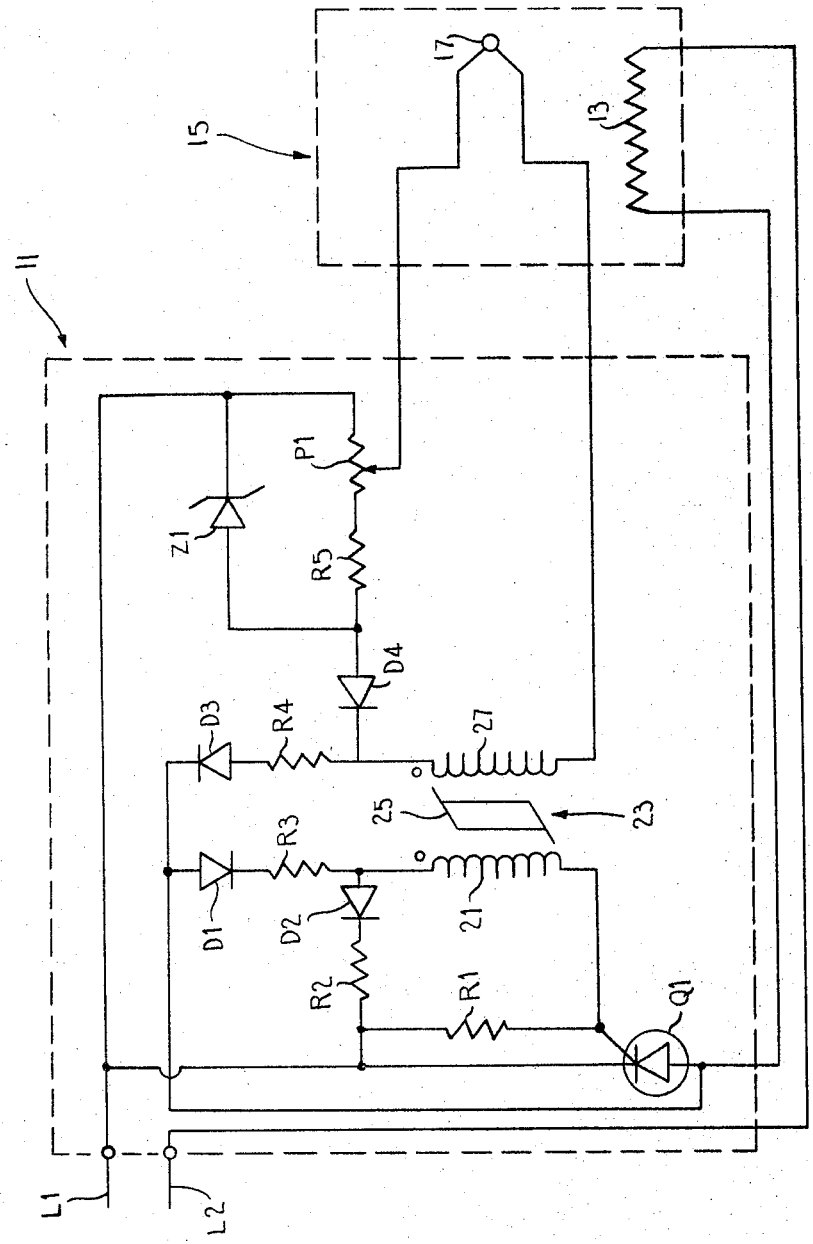
FIG. 3 is a schematic circuit diagram of another embodiment of the controller according to the present invention.

The amount of power which is dissipated by the control circuitry in the form of heat is reduced by the arrangement illustrated in FIG. 3. In this embodiment, current for the triggering and reset windings is taken from the anode terminal of the SCR Q1 through diodes D1 and D3 instead of directly from the line L2. Accordingly, when the SCR is fired, the voltage applied to the control circuitry drops to a very low value, e.g., approximately one volt. The principal sources of heat in the control circuitry are the SCR when it is conducting and the resistor R3. In the FIG. 3 arrangement, an appreciable voltage is developed across resistor R3 only when the SCR is not conducting. Thus, only one of these elements is dissipating appreciable power at any one time and the total dissipation of the control circuitry is reduced as compared with the arrangement of FIG. 1. This reduced dissipation is desirable when the controller is to be packaged in a confined area as when the apparatus is employed for providing a constant temperature for miniature electronic equipment.

Figure 4:
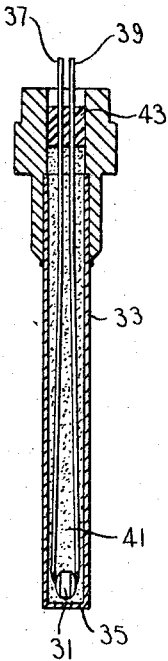
FIG. 4 is a view in section of a thermistor temperature sensing probe.

FIG. 4 illustrates a thermistor probe which is particularly useful when the controls according to the invention are used to maintain temperatures at high levels for prolonged periods of time. The thermistor 31 is enclosed within an elongate metal probe tube 33 which is adapted to be inserted into relatively inaccessible areas within which it is desired to provide temperature control. The tube has a closed end 35 near which the thermistor is supported. The thermistor includes leads 37 and 39 which extend out of the open end of the tube for connection with the control circuitry. Thermistor 31 is electrically insulated from the tube walls by a refractory powder 41 which has both good thermal conductivity and high electrical resistance. This powder is compacted around thermistor 31 and is held in place by a cast resin header 43. A preferred material for use as powder 41 is finely divided magnesium oxide. Zirconium and beryllium oxides are also highly desirable. By providing electrical insulation with minimum thermal insulation, these materials allow the control to have a rapid response which is relatively undelayed by thermal inertia within the probe itself. Further, these materials are stable over long periods at high temperature so that the temperature level maintained by the controller does not vary.

Figure 5:
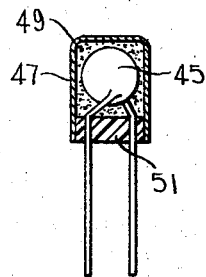
FIG. 5 is a view in section of a thermistor surface temperature sensor.

FIG. 5 illustrates a thermistor assembly which is adapted for surface mounting on a component whose temperature is to be controlled. A thermistor 45 is mounted within a shallow metallic cup or casing 47 with its leads extending out of the open end of the cup. Powdered magnesium oxide 49 is compacted around the thermistor and held in place by a header 51. As in the embodiment of FIG. 4, the compacted magnesium oxide powder electrically insulates the thermistor 45 while conducting heat thereby permitting the thermistor to follow the temperature of the cup 47 closely.

While in the example illustrated, a heater has been used to vary the temperature in the controlled zone, it should be understood that cooling means such as a thermoelectric cooler may also be used to vary the temperature within a controlled zone to an extent which is a function of its energization. Similarly, positive temperature coefficient thermistors may be used and other semiconductor switching devices may be substituted for the SCR shown.

In view of the above, it will be seen that the several objects of the invention are achieved and other advantageous results attained.

As various changes could be made in the above apparatus and methods without departing from the scope of the invention, it is intended that all matter contained in the above description or shown in the accompanying drawings shall be interpreted as illustrative and not in a limiting sense.

What is claimed is:

1. A temperature controller for maintaining the temperature in a zone to be controlled at a predetermined level, said controller comprising:
    means in heat exchange relationship with said zone for varying the temperature thereof when energized;
    a triggerable semiconductor switching device for switching the flow of power to said means;
    a thermistor adapted to sense the temperature in said zone;
    a saturable magnetic core;
    first circuit means including a first winding interconnected with said thermistor for periodically magnetizing said core in one direction to an extent which is a function of the temperature of said thermistor; and
    second circuit means including a second winding for magnetizing said core alternately with said first circuit means in the opposite direction to an extent which is a function of time, said second winding being interconnected with said semiconductor switching device for triggering said device into conduction after said core saturates, the time at which said device is triggered being a function of the previous magnetization of said core by said first winding whereby the proportion of time during which said device conducts is a function of the temperature of said zone which maintains the zone temperature at said predetermined level.

2. A temperature controller for maintaining the temperature in a zone to be controlled at a predetermined level, said controller comprising:
    an electric heater adapted to heat said zone;
    means adapted to supply A.C. electric power to said heater;
    an SCR the anode-cathode circuit of which is connected for switching the flow of power to said heater;
    a saturable magnetic core;
    a first winding on said core;
    a thermistor adapted to sense the temperature of said zone connected in a first series circuit with said first winding;
    means for applying a voltage to said first series circuit during A.C. half cycles of one polarity thereby to magnetize said core in one direction to an extent which is a function of the temperature of said thermistor;
    a second winding on said core connected in a second series circuit with the gate-cathode circuit of said SCR; and
    means for applying a voltage to said second series circuit during A.C. half cycles of opposite polarity for magnetizing said core in the opposite direction to an extent which is a function of time thereby to trigger said SCR into conduction upon saturation of said core after a delay which is a function of the previous magnetization of said core by said first winding, the current passing through said second winding prior to saturation of said core being insufficient to trigger said SCR whereby the delay before firing of said SCR during A.C. half cycles of said opposite polarity is a function of the resistance of said thermistor and the modulation of the average power supplied to said heater maintains the temperature of said zone at said predetermined level.

3. A temperature controller as set forth in claim 2 wherein the resistance of said thermistor at the temperature to be maintained is greater than the reactance of said first winding.

4. A temperature controller as set forth in claim 2 wherein said thermistor is enclosed within a metallic protective casing and is electrically insulated therefrom by a refractory powder which is a relatively good heat conductor.

5. A temperature controller as set forth in claim 4 wherein said casing is an elongate probe tube.

6. A temperature controller as set forth in claim 4 wherein said powder is magnesium oxide.

7. A temperature controller as set forth in claim 4 wherein said powder is zirconium oxide.

8. A temperature controller as set forth in claim 4 wherein said powder is beryllium oxide.

9. A temperature controller for maintaining the temperature in a zone to be controlled at a predetermined level, said controller comprising:
    an electric heater adapted to heat said zone;
    means adapted to supply A.C. electric power to said heater; and
    a control circuit connected in series with said heater across said means, said circuit including
        an SCR the anode-cathode circuit of which is connected for switching the flow of power to said heater,
        a saturable magnetic core,
        a first winding on said core,
        a thermistor adapted to sense the temperature of said zone connected in a first series circuit with said first winding,
        means for applying a voltage from the anode of said SCR to said first series circuit during A.C. half cycles of one polarity for magnetizing said core in one direction to an extent which is a function of the temperature of said thermistor,
        a second winding on said core connected in a second series circuit with the gate-cathode circuit of said SCR,
        means for applying a voltage from the anode of said SCR to said second series circuit during A.C. half cycles of opposite polarity for magnetizing said core in the opposite direction to an extent which is a function of time thereby to trigger said SCR into conduction upon saturation of said core after a delay which is a function of the previous magnetization of said core by said first winding, the current passing through said second winding prior to saturation of said core being insufficient to trigger said SCR,
    whereby the modulation of the average power supplied to said heater maintains the temperature of said zone at said predetermined level and said control circuit dissipates relatively little power after said SCR is triggered.

10. The method of maintaining at a predetermined level the temperature in a zone provided with a heater and an SCR, the anode-cathode circuit of which is connected with said heater for controlling the energization thereof, said method comprising:
    applying A.C. power to said heater and SCR;
    sensing the temperature of said zone;
    on A.C. half cycles of one polarity magnetizing a saturable core in one direction to an extent which is a function of the temperature of said zone;

on A.C. half cycles of the opposite polarity magnetizing said core in the opposite direction to an extent which is a function of time; and when said core saturates in said opposite direction, triggering said SCR whereby the power supplied to said heater is modulated as an inverse function of the temperature of said zone thereby maintaining the zone temperature at said predetermined level.

References Cited

UNITED STATES PATENTS

| 2,957,153 | 10/1960 | Greenberg | 338—28 |
| 3,180,974 | 4/1965 | Darling | 219—501 X |
| 3,202,800 | 8/1965 | Phillips et al. | 219—501 X |
| 3,267,733 | 8/1966 | Chambers | 338—28 X |
| 3,310,656 | 3/1967 | Sproul | 219—501 X |

RICHARD M. WOOD, *Primary Examiner.*

L. H. BENDER, *Assistant Examiner.*